United States Patent
Lhommeau et al.

(10) Patent No.: US 11,976,567 B2
(45) Date of Patent: May 7, 2024

(54) BLADE FOR A TURBOMACHINE FAN, COMPRISING AN IDENTIFICATION MEDIUM, AND METHOD FOR READING SUCH AN IDENTIFICATION MEDIUM

(71) Applicant: SAFRAN AIRCRAFT ENGINES, Paris (FR)

(72) Inventors: Tony Alain Roger Joël Lhommeau, Moissy-Cramayel (FR); Dimitri Germinal Soteras, Moissy-Cramayel (FR); Clément René Roger Sirot, Moissy-Cramayel (FR); Alain Laurent Christian Vitalis, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/625,057

(22) PCT Filed: Jun. 25, 2020

(86) PCT No.: PCT/EP2020/067806
§ 371 (c)(1),
(2) Date: Jan. 5, 2022

(87) PCT Pub. No.: WO2021/008842
PCT Pub. Date: Jan. 21, 2021

(65) Prior Publication Data
US 2022/0282625 A1 Sep. 8, 2022

(30) Foreign Application Priority Data
Jul. 16, 2019 (FR) ........................................ 1907989

(51) Int. Cl.
*F01D 5/28* (2006.01)
*F01D 17/02* (2006.01)

(52) U.S. Cl.
CPC ............. *F01D 5/282* (2013.01); *F01D 17/02* (2013.01); *F05D 2220/323* (2013.01);
(Continued)

(58) Field of Classification Search
CPC ..... F01D 5/00; F01D 5/12; F01D 5/28; F01D 5/282; F01D 5/30; F01D 5/3007;
(Continued)

(56) References Cited

U.S. PATENT DOCUMENTS 8,341,841 B2 * 1/2013 Fessler-Knobel ...... B23Q 3/063
29/889
2011/0133949 A1 6/2011 Subramanian et al.
(Continued)

FOREIGN PATENT DOCUMENTS

DE 102015105357 A1 11/2015

OTHER PUBLICATIONS

Search Report from the French Intellectual Property Office on corresponding FR application (FR1907989) dated Mar. 19, 2020.
(Continued)

*Primary Examiner* — Elton K Wong
(74) *Attorney, Agent, or Firm* — Alumen IP Law PC

(57) ABSTRACT

A blade for a turbomachine fan, the blade being made from a composite material containing a plurality of longitudinal conductive fibres embedded in an electrically non-conductive matrix, the blade having at least one fastening region to which an identification medium for identifying the blade is fastened, the fastening region containing longitudinal fibres oriented along a preferred fibre axis, the identification medium contains an item of identification data for identifying the blade and at least one radio antenna having at least one communication lobe configured so as to receive a read request and transmit the item of identification data in return, the communication lobe being oriented along a radio axis (Continued)

that is angularly offset from the preferred fibre axis by less than 45°, preferably by less than 22.5°.

16 Claims, 6 Drawing Sheets

(52) U.S. Cl.
CPC ...... *F05D 2220/36* (2013.01); *F05D 2240/12* (2013.01); *F05D 2240/80* (2013.01); *F05D 2260/80* (2013.01); *F05D 2300/6034* (2013.01)

(58) Field of Classification Search
CPC ......... F05D 2300/6034; F05D 2240/80; F05D 2260/80; F05D 2220/323; F05D 2220/36
See application file for complete search history.

(56) References Cited

U.S. PATENT DOCUMENTS

| 2011/0133950 | A1* | 6/2011 | Subramanian | ............ F23R 3/00 340/870.28 |
| 2015/0061893 | A1 | 3/2015 | Bevly, III et al. | |
| 2016/0230568 | A1* | 8/2016 | Sippel | .................... B32B 18/00 |
| 2020/0166431 | A1* | 5/2020 | Schleif | .................... F01D 17/20 |

OTHER PUBLICATIONS

International Search Report and Written Opinion on corresponding PCT application (PCT/EP2020/067806) from International Searching Authority (EPO) dated Oct. 5, 2020.

\* cited by examiner

BLADE FOR A TURBOMACHINE FAN, COMPRISING AN IDENTIFICATION MEDIUM, AND METHOD FOR READING SUCH AN IDENTIFICATION MEDIUM

TECHNICAL FIELD

The present invention relates to the field of turbomachines used for aircraft propulsion and, in particular, to a turbomachine comprising fan vanes.

In a known manner, with reference to FIG. 1, a turbomachine 100 extending along a turbomachine axis X and enabling the aircraft to be moved from an air flow entering the turbomachine 100 and circulating from upstream to downstream is represented. Hereafter, the terms "upstream" and "downstream" are defined in relation to the turbomachine axis X oriented from upstream to downstream. Similarly, the terms "internal" and "external" are defined along a radial direction R defined in relation to the axis X. In a known manner, the turbomachine 100 comprises a compressor, a combustion chamber and a turbine for rotatably driving the compressor. Upstream, the turbomachine 100 comprises a fan 110 which is for accelerating the air flow from upstream to downstream in the turbomachine 100.

The fan 110 comprises a disc 111, rotatably integral with a shaft of the compressor, comprising housings, distributed around the periphery of the disc 111, in which vanes 1 are respectively mounted by axial insertion along the turbomachine axis X from upstream to downstream. The vanes 1 extend in a same plane transverse to the turbomachine axis X. In this example, the turbomachine 100 comprises a cone 112 which is mounted upstream of the disc 111.

Preferably, with reference to FIG. 2, each vane 1 radially extends along an axis R in relation to the turbomachine axis X and successively comprises a radially internal mounting root 11, configured to be mounted in one of said housings of the disc 111, a platform 12 and a radially external air deflection blade 13. In a known manner, each fan vane 1 is uniquely identified by a serial number SN and a part number PN. With reference to FIGS. 2 and 3, the serial number 21 and part number 22 are written on a medium 2, preferably made of fabric, which is fastened to a portion of the mounting root 11 and covered with a protective varnish.

In practice, the fan 110 of a turbomachine 100 should be equipped with suitable fan vanes 1 for the turbomachine 100 to operate optimally. In particular, it is necessary to ensure that the vanes 1 of a same fan 110 have compatible serial numbers 21 and part numbers 22.

A problem arises for companies that lease turbomachines to customers given that customers may need to replace one or more vanes 1 of the fan 110 during the lease period. On return of the turbomachine, it is the responsibility of the lessor to check that the vanes 1 mounted to the fan 110 are actually compatible before the turbomachine can be leased again. Checking the serial numbers 21 and part numbers 22 of the vanes 1 in a fan 110 is particularly tedious and time consuming.

Indeed, in order to visually gain access to the medium 2 containing the serial number 21 and part number 22, an operator should disassemble the upstream portion of the turbomachine, in particular, the fan cone 112, a shell, locks and shims before gaining access to the vanes 1. After reading the serial number 21 and part number 22, the operator should reassemble the upstream portion of the turbomachine, which is time-consuming and increases the risk of damage and assembly error (non-compliance). In addition, such a method does not protect the operator from mistakenly entering the serial numbers 21 and part numbers 23.

Incidentally, in another application, it is known in prior art from patent application EP2224379A1 to use a radio frequency identification type medium, more commonly known by its acronym RFID, on a compressor vane in order to track its state during the operation of the turbine engine. For this purpose, a radio frequency identification reader is provided in the turbine engine to read the RFID medium over time. Such teaching is not relevant to an operator seeking to identify a vane from outside the turbine engine. Indeed, the turbine engine comprises many metal parts that provide electromagnetic shielding and forms a Faraday cage.

The purpose of the invention is to eliminate at least some of these drawbacks.

Document US2011133949A1 teaches to arrange sensors in a turbomachine connected in a wired manner to an antenna so that the latter can transmit the measurements from the sensors to a remote calculator wirelessly offset.

SUMMARY

The invention relates to a fan vane for an aircraft turbomachine extending along a turbomachine axis, the vane being made of a composite material comprising a plurality of longitudinal conductive fibers embedded in an electrically non-conductive matrix, the vane comprising at least one fastening zone to which a vane identification medium is fastened.

The invention is remarkable in that, the fastening zone comprising longitudinal fibers oriented along a favored fiber axis, the identification medium comprises at least one memory for storing an identification piece of data for the vane and at least one radio antenna comprising at least one communication lobe configured to receive a read request and to transmit back the identification piece of data, the communication lobe being oriented along a radio axis which is angularly offset from the favored fiber axis by less than 45°, preferably by less than 22.5°.

Advantageously, by virtue of the invention, there is a synergy between the communication lobe of the identification medium and the longitudinal fibers of the fastening zone which makes it possible to dispense with electromagnetic shielding of the fan whose structure forms a Faraday cage. The prejudice of radio communicating with good performance outside the turbomachine is thus overcome.

By virtue of the invention, it is not necessary for an operator to disassemble an upstream portion of the fan to reach the vanes and read the serial number and part number of each vane. An operator can quickly and conveniently obtain the identification data by radio at a distance from the fan. The risk of damage to the fan vanes as well as the risk of mistakenly entering the identification data are very limited.

According to one aspect, the vane successively comprises a mounting root configured to be mounted along the turbomachine axis, a platform and an air deflection blade, the fastening zone belonging to the mounting root. Fastening to the mounting root is advantageous given that the identification medium does not interfere with the aerodynamic flow when the turbomachine is in use. The disadvantage of the mounting root is that it belongs to a zone with significant electromagnetic shielding. With the invention, this disadvantage is advantageously suppressed.

Preferably, the mounting root comprises at least one side wall, azimuthally defined in relation to the axis of the turbomachine when the vane is mounted to said turbomachine, the side wall comprising longitudinal fibers whose favored fiber axis extends substantially orthogonal to the axis of the turbomachine when the vane is mounted to said turbomachine, the fastening zone belonging to the side wall. A side wall has a large surface area to receive an identification medium with large dimensions. Once the root is mounted in a fan disc, electromagnetic shielding is highly significant but this drawback is suppressed by the invention.

Still preferably, the mounting root comprises at least one upstream wall, axially defined in relation to the axis of the turbomachine when the vane is mounted to said turbomachine, an air flow circulating from upstream to downstream in the turbomachine, the upstream wall comprises longitudinal fibers whose favored fiber axis extends substantially orthogonal to the axis of the turbomachine when the vane is mounted to said turbomachine, the fastening zone belonging to the upstream wall. An upstream wall has the advantage of being less prone to electromagnetic shielding but has a narrower surface area.

According to another aspect, the vane successively comprises a mounting root configured to be axially mounted along a turbomachine axis from upstream to downstream, a platform and an air deflection blade radially extending along an axis in relation to the turbomachine axis, the fastening zone belonging to the platform, preferably to a radially internal wall of the platform. Fastening a radially internal wall of the platform is advantageous given that the identification medium does not disturb the aerodynamic flow when the turbomachine is in use.

In all three of the above configurations, the radio axis of the communication lobe of the radio antenna is oriented substantially orthogonal to the axis of a turbomachine when the vane is mounted to said turbomachine. Such an orientation is contrary to a prior art mounting which taught to place an identification medium along the axis of the turbomachine to be visually read.

Preferably, the identification medium is of the radio frequency identification type. Such an identification medium is robust and allows identification data to be collected conveniently.

Preferably, the identification medium is an identification medium for a metal fastening zone. Such an identification medium is in contrast to media dedicated to non-metallic media or mixed media known to the skilled person. An identification medium for a metallic fastening zone allows increased amplification of the communication lobe, in particular, when the fibers are non-metallic and the identification medium is configured to be mounted to a metal surface.

According to one preferred aspect, the identification medium comprises an elongate shape body in which the storage memory and the radio antenna are mounted.

The invention also relates to a method for reading an identification medium of at least one fan vane as set forth above, comprising:
 a step of radio receiving a read request by the radio antenna of the identification medium and
 a step of radio transmitting at least one identification piece of data from the storage memory by the radio antenna of the identification medium.

Advantageously, the identification data of an individual vane can be quickly and conveniently read.

The invention further relates to a method for reading the identification media of a plurality of fan vanes as set out above, comprising:
 a step of radio receiving a read request by the radio antenna of each identification medium and
 a step of radio transmitting at least one identification piece of data from the storage memory by the radio antenna of each identification medium.

Advantageously, the identification data of the vanes can be collectively quickly and conveniently read.

BRIEF DESCRIPTION OF THE DRAWINGS

The invention will be better understood upon reading the following description, which is given by way of example only, with reference to the appended drawings, which are given as non-limiting examples, in which identical references are given to similar objects and in which.

It should be noted that the figures set out the invention in detail for implementing the invention, said figures can of course be used to better define the invention where appropriate.

DETAILED DESCRIPTION

Figure 1:
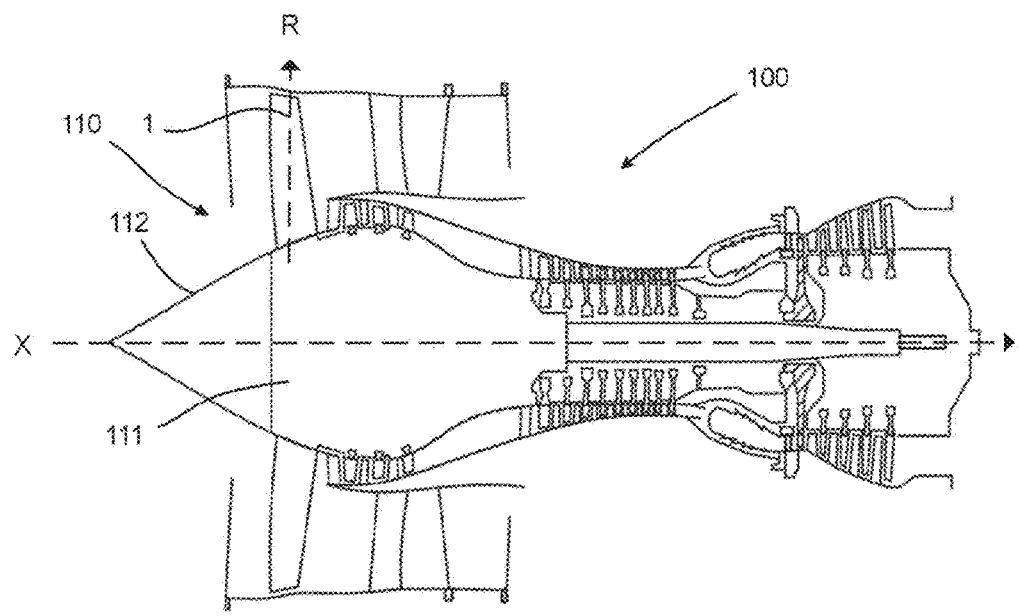
FIG. 1 is a schematic representation in a longitudinal cross-section view of a turbomachine according to prior art.
Figure 2:
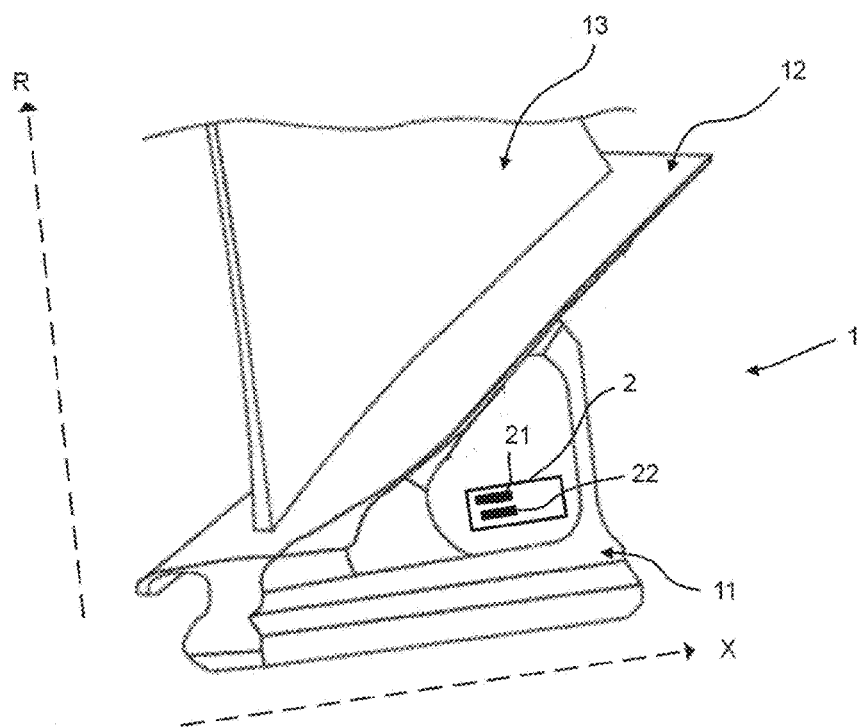
FIG. 2 is a schematic representation of a fan vane with an identification medium according to prior art.
Figure 3:
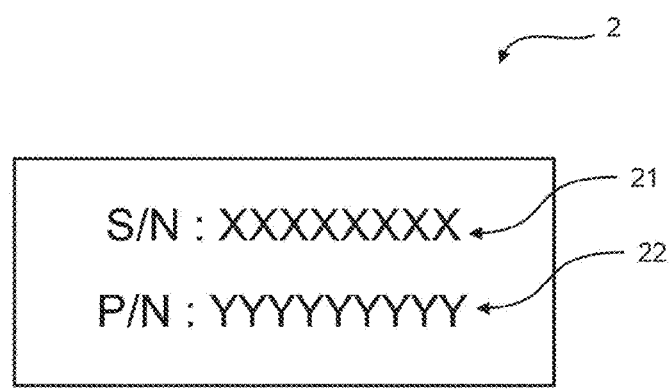
FIG. 3 is a schematic representation of the identification medium of FIG. 2.
Figure 4:
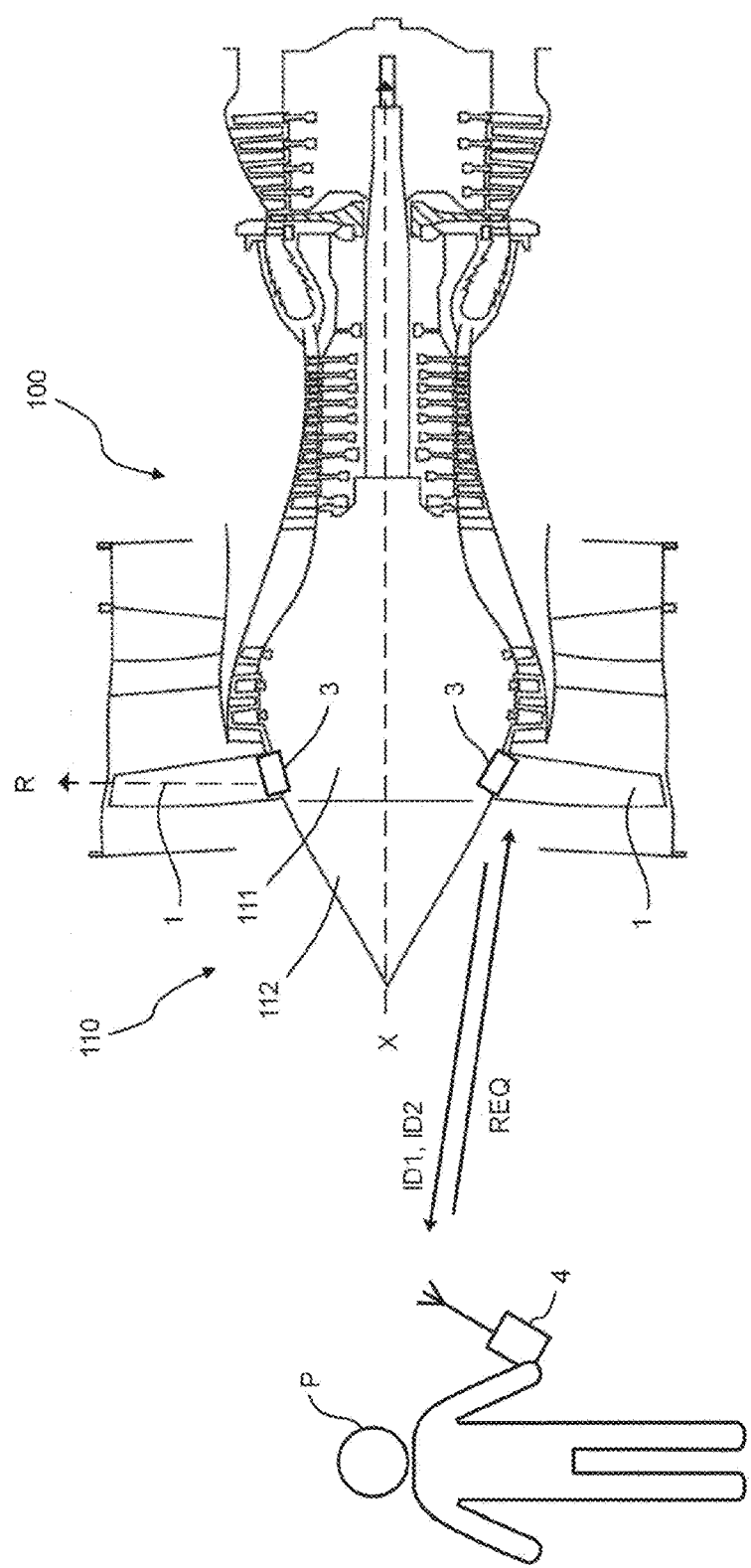
FIG. 4 is a schematic representation of a step of reading the identification data of a fan vane of a turbomachine according to the invention.

With reference to FIG. 4, there is represented a turbomachine 100 extending along a turbomachine axis X and for moving the aircraft from an air flow entering the turbomachine 100 and circulating from upstream to downstream. Hereafter, the terms "upstream" and "downstream" are defined in relation to the turbomachine axis X oriented from upstream to downstream. Similarly, the terms "internal" and "external" are defined along a radial direction R defined in relation to the axis X. In a known manner, the turbomachine 100 comprises a compressor, a combustion chamber and a turbine for rotatably driving the compressor. Upstream, the turbomachine 100 comprises a fan 110 for accelerating the air flow from upstream to downstream in the turbomachine 100.

The fan 110 comprises a disc 111, rotatably integral with a shaft of the compressor, comprising housings, distributed around the periphery of the disc 111, in which vanes 1 are respectively mounted by axial insertion along the turbomachine axis X from upstream to downstream. The vanes 1 extend in a same plane transverse to the turbomachine axis X. For the sake of clarity and brevity, only one vane 1 will now be set forth. In this example, the turbomachine 100 comprises a cone 112 which is mounted upstream of the disc 111.

Figure 5:
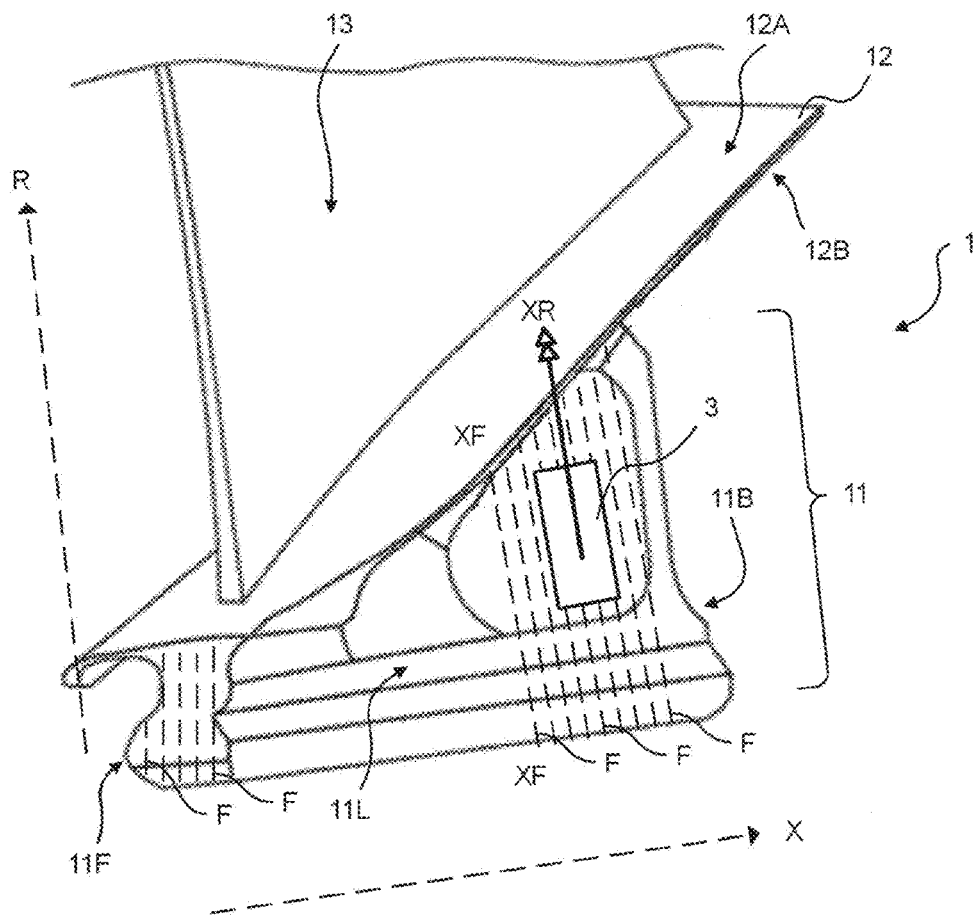
FIG. 5 is a schematic representation of a fan vane with an identification medium according to one embodiment of the invention.

With reference to FIG. 5, each vane 1 extends along a radial axis R and successively comprises a mounting root 11 configured to be axially mounted along a turbomachine axis X in a housing of the disc 111 of the fan 110, a platform 12 and an air deflection blade 13 radially extending along the radial axis R in relation to the turbomachine axis X. The vane 1 radially extends in the mounted position. The mounting root 11 is thus referred to as radially internal while the air deflection blade 13 is referred to as radially external.

As illustrated in FIG. 5, the platform 12 comprises a radially external face 12A which is in the air flow, and a radially internal face 12B which is opposite to the radially external face 12A. The mounting root 11 comprises two side walls 11L, also called azimuthal walls, an upstream wall 11F and a downstream wall 11B. The walls 11L, 11B, 11F extend substantially radially along the radial axis R as illustrated in FIG. 5. The walls of the mounting root 11 are defined in relation to the way they are mounted in the turbomachine.

The vane 1 is made of a composite material comprising a plurality of longitudinal fibers F embedded in a matrix. According to the invention, the longitudinal fibers F are electrically conductive while the matrix is not electrically conductive. Preferably, the longitudinal fibers F are, in particular metallic, reinforcing fibers. In this example, the longitudinal fibers F are made of carbon, but it goes without saying that other materials could be suitable, for example aluminum or copper. The matrix is in this example thermosetting but it could be of a different kind. A vane 1 of composite material is known to the skilled person and will not be set forth in more detail.

In a known manner, in a local zone of the vane 1, the longitudinal fibers F are oriented along a favored fiber axis XF. In other words, the longitudinal fibers F are locally parallel and oriented along a favored fiber axis XF. By favored fiber axis XF, it is meant the axis to which most of the fibers F are parallel in said local zone.

In practice, the fibers F are woven in several directions, in particular in a 3D weave, of which one direction is preferred which is hereinafter referred to as "favored fiber axis XF" and which is perfectly identified during weaving.

In this example, still with reference to FIG. 5, the side wall 11L of the mounting root 11 comprises longitudinal fibers F which are oriented along a favored fiber axis XF which is substantially radial, that is orthogonal to the axis X of the turbomachine. Similarly, the upstream wall 11L of the mounting root 11 comprises longitudinal fibers F which are oriented along a favored fiber axis XF which is substantially radial, that is, orthogonal to the axis X of the turbomachine. Similarly, the platform 12 and the air deflection blade 13 comprise longitudinal fibers F.

According to the invention, with reference to FIG. 5, the vane 1 comprises at least one fastening zone to which an identification medium 3 comprising at least one identification piece of data ID1, ID2 of the vane 1, is fastened. A fastening zone is a local zone for which a favored fiber axis XF is determined.

Figure 6:
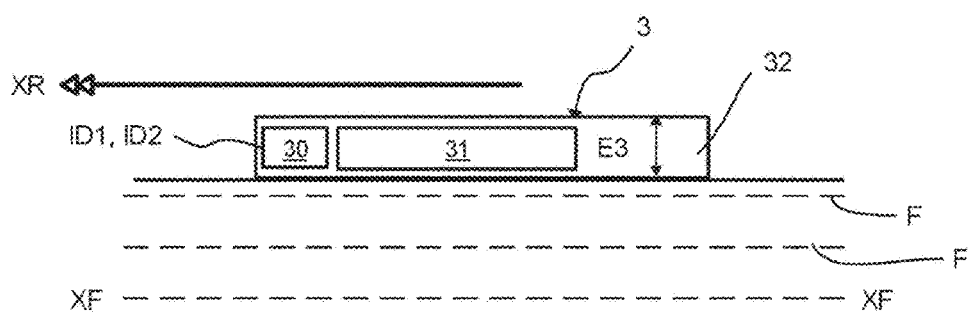
FIG. 6 is a schematic representation in a longitudinal cross-section view of an identification medium according to one embodiment of the invention.

With reference to FIG. 6, there is represented an identification medium 3 according to one embodiment of the invention.

The identification medium 3 comprises a storage memory 30 in which two identification pieces of data ID1, ID2 are stored, in particular, a serial number ID1 known as "serial number SN" and a part number ID2 known as "part number PN". Preferably, the storage memory 30 is of the computer type and the identification data ID1, ID2 are computer data. It goes without saying that the storage memory 30 could store a single identification piece of data such as a single identifier which would make it possible to identify in a particular way a part or more than two identification pieces of data such as a manufacturer's identifier (CAGE code, etc.), a date of manufacture, a degree of sensitivity to specific fluids, an operating authorization reference, data related to the maintenance or logistical operations of the part such as the operational status, operations carried out, etc.

The identification medium 3 further comprises a radio antenna 31 configured to receive a read request REQ and to transmit back the identification data ID1, ID2. Preferably, the identification medium 3 is of the radio frequency identification type, better known as its acronym RFID. The identification medium 3 may comprise a battery or be remotely powered. Such an identification medium 3 is known to the person skilled in the art.

In a known manner, identification media of the radio frequency identification type are divided into those intended for "non-metallic" use, those intended for "metallic" use and those intended for "mixed" use. Preferably, the identification medium 3 is intended for "metallic" use. Such an identification medium 3 has a higher performance by interaction with the longitudinal fibers F of the vane 1 which are electrically conductive as will be set forth later. With reference to FIG. 6, an identification medium 3 intended for "metallic" use has a thickness E3 which is greater than 1 mm, preferably greater than 2 mm. In comparison, an identification medium 3 intended for "non-metallic" use has a thickness of less than 1 mm.

Figure 7:
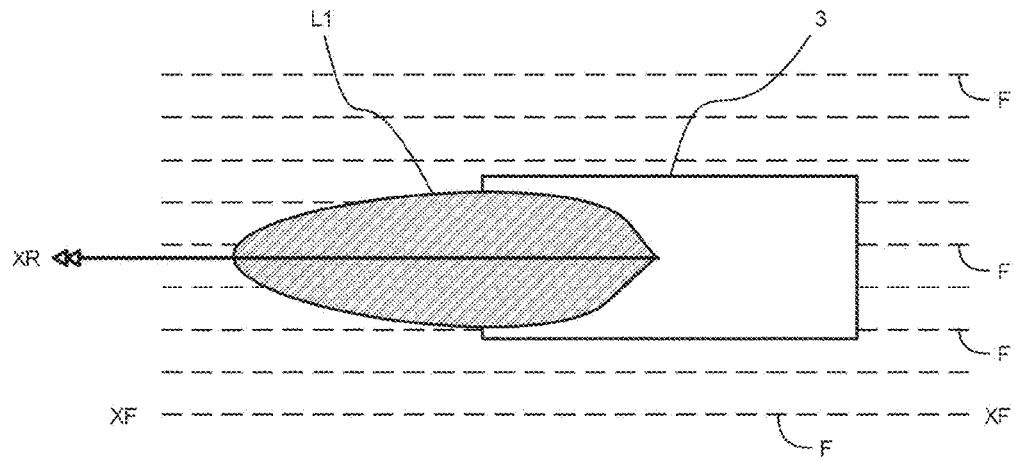
FIG. 7 is a schematic top representation of an identification medium comprising one radio lobe in the mounted position.
Figure 8:
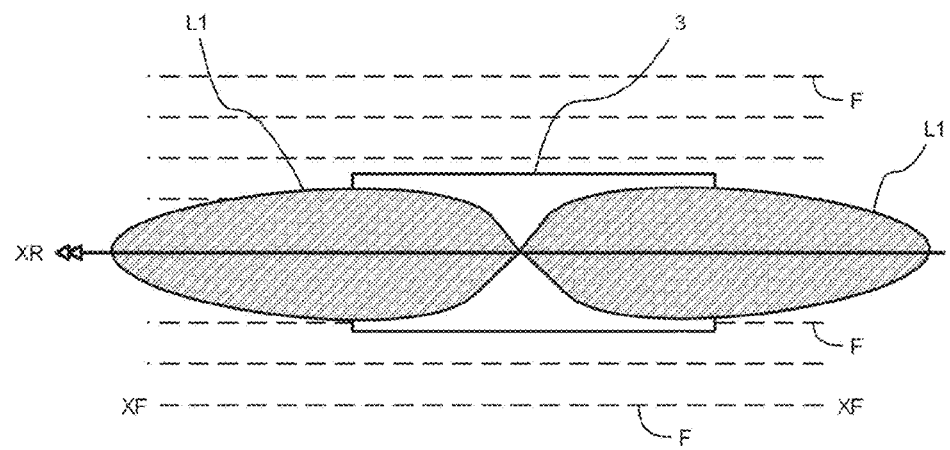
FIG. 8 is a schematic top representation of an identification medium comprising two radio lobes in the mounted position.

According to the invention, the radio antenna 31 comprises at least one communication lobe L1 oriented along a radio axis XR to receive a read request REQ and transmit back the identification data ID1, ID2. With reference to FIGS. 6 and 7, the radio antenna 31 comprises a single communication lobe L1, also referred to as the primary lobe, but it goes without saying that it could comprise more than one, in particular two thereof. As illustrated in FIG. 8, the radio antenna 31 may in particular comprise two communication lobes L1 aligned along a same radio axis XR. Such an identification medium 3 can thus be used along two opposite senses, along a same direction.

In this example, with reference to FIG. 6, the identification medium 3 comprises a body 32, which is in particular non-conductive, such as a polymer or ceramic material, in which the memory 30 and the radio antenna 31 are mounted. With reference to FIGS. 6 and 7, the body 32 has a rectangular shape but it goes without saying that it could be any shape, in particular a square shape or a round or wire shape.

Figure 9:
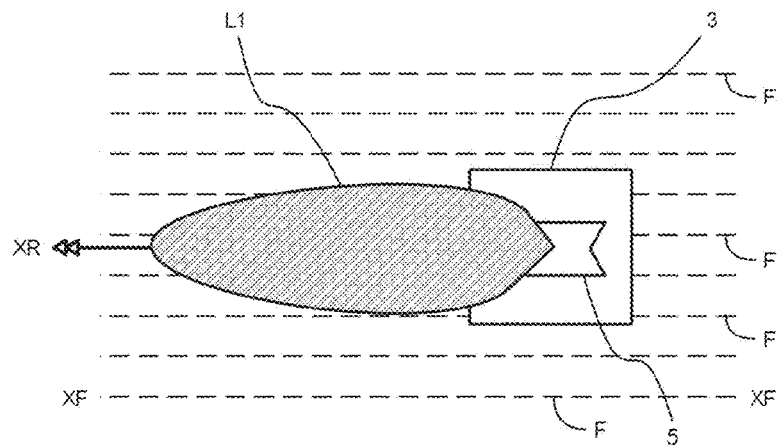
FIG. 9 is a schematic top representation of a square-shaped identification medium with one radio lobe in the mounted position.
Figure 10:
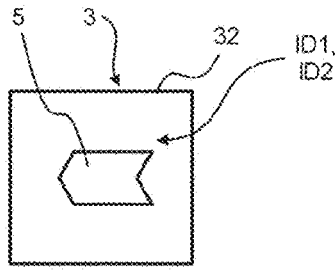
FIG. 10 is a schematic representation of an identification medium according to the invention not comprising visual information.

Preferably, in the case of an elongate shape body 32, the radio axis XR extends along the length of said body 32 as illustrated in FIGS. 6 to 8. With reference to FIG. 9, when the body 32 is not elongate, the body 32 advantageously comprises a visual orientation indicator 5 of the radio axis XR as illustrated in FIGS. 9 and 10 in order to allow optimal orientation of the identification medium 3 on a fastening zone of the vane 1 by an operator as will be set forth hereafter.

Figure 11:
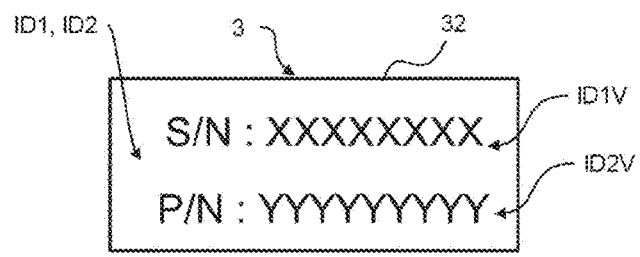
FIG. 11 is a schematic representation of an identification medium according to the invention comprising visual information.

As illustrated in FIG. 11, the identification medium 3 comprises the identification data ID1, ID2 as computer data but also visual identification indicators ID1V, ID2V in order to allow the identification data to be read both by radio and visually. In this example, the visual identification indicators ID1V, ID2V are printed on the body 32 of the identification medium 3. Preferably, when the dimensions of the identification medium 3 are too narrow in relation to the visual identification indicators ID1V, ID2V, the identification medium 3 only comprises the identification data ID1, ID2 as computer data as illustrated in FIG. 10.

According to the invention, with reference to FIG. 5, the identification medium 3 is fastened to a fastening zone of the vane 1 comprising longitudinal fibers F oriented along a favored fiber axis XF. Advantageously, the communication lobe L1 is oriented along a radio axis XR which is angularly offset from the favored fiber axis XF by less than 45°, preferably by less than 22.5°. Preferably, the radio axis XR is parallel to the favored fiber axis XF. Preferably, the radio axis XR and the favored fiber axis XF are aligned.

When a radio antenna 31 comprises several communication lobes L1, it is preferred that the main communication lobe L1 is aligned in accordance with the defined alignment with the favored fiber axis XF.

Advantageously, the use of an identification medium 3 intended for "metallic" use enhances interactions between the longitudinal conductive fibers F which are conductive and the radio antenna 30, thereby improving amplification. The identification data ID1, ID2 can be read from a greater distance. Preferably, a metallic interface member is positioned between the identification medium 3 and the fastening zone to improve communication performance. The metallic interface member is preferably electrically conductive (for example Al, Ti, Cu, Pt, Au, Fe, Pb, Sn, Ni or the like and combinations thereof). Preferably, the metal interface member has a thickness between 0.001 mm and 20 mm. According to one aspect of the invention, the metal interface member is mounted to the composite by bonding for an easier installation.

According to a first embodiment, with reference to FIG. 5, a side wall 11L of the mounting root 11 comprises the fastening zone of the identification medium 3. The side wall 11L has a large surface area for fastening the identification medium 3. In this example, the longitudinal fibers F of the side wall 11L of the mounting root 11 radially extend along the axis R and the identification medium 3 is oriented so that the radio axis XR is radially oriented along the axis R outwardly so as to benefit from the best communication conditions. Preferably, the identification medium 3 is fastened to a downstream portion of the side wall 11L since it has a greater radial height and many radial fibers F.

In this embodiment, since the available space is large, the identification medium 3 has an elongate shape and comprises visual identification indicators ID1V, ID2V (FIG. 11) in order to allow the identification data to be read by radio and visually.

Figure 12:
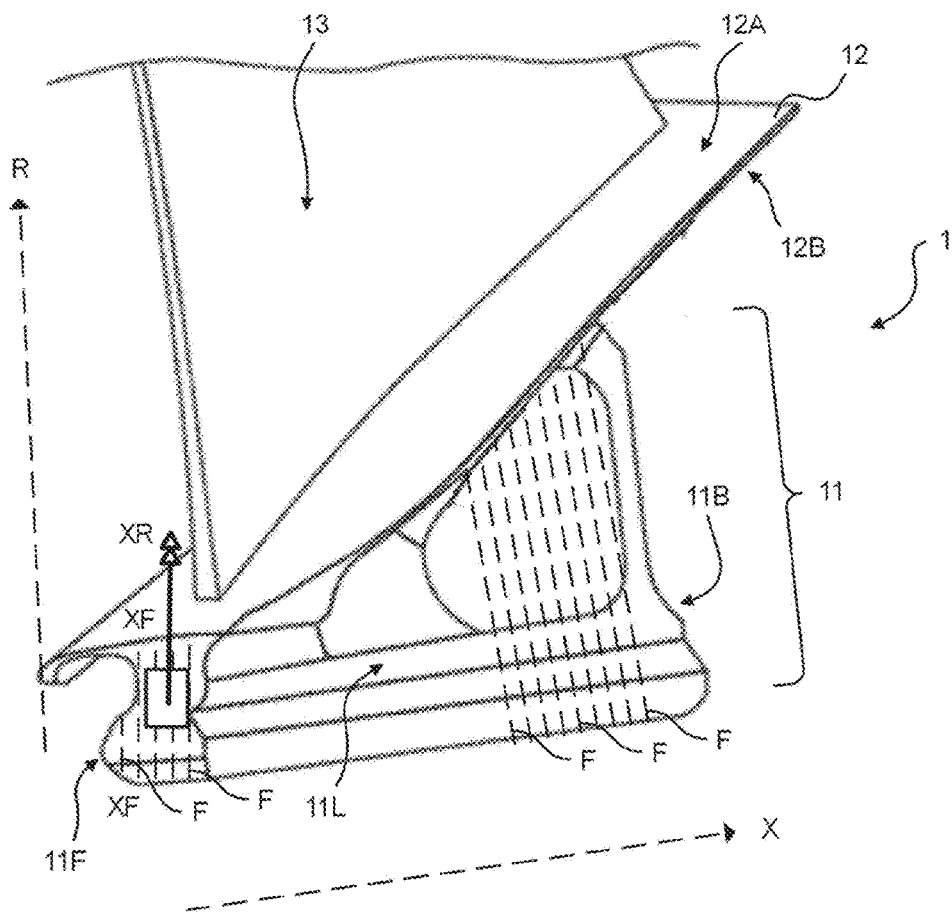
FIG. 12 is a schematic representation of a fan vane with an identification medium according to another embodiment of the invention.

According to a second embodiment, with reference to FIG. 12, an upstream wall 11F of the mounting root 11 comprises the fastening zone of the identification medium 3. The upstream wall 11F, also known as the scaffold pole, has a reduced surface area which nevertheless allows the identification medium 3 to be fastened. In this example, the longitudinal fibers F of the upstream wall 11F of the mounting root 11 radially extend and the identification medium 3 is oriented in such a way that the radio axis XR is radially oriented along the axis R outwardly in order to benefit from the best communication conditions.

In this example, given that the space available is small, the identification medium 3 has a reduced shape and does not comprise visual identification indicators ID1V, ID2V (FIG. 11) but only a visual orientation indicator 5 of the radio axis XR (FIG. 10).

Preferably, the identification medium 3 is fastened to the vane 1 on a zone that is not in contact with the air flow to be accelerated, that is an aerodynamic zone. Thereby, the identification medium 3 is preferably fastened to the mounting root 11 or to an internal surface 12B of the platform 12 of the vane 1. In this example, the identification medium 3 is fastened to the surface of the vane 1 but it goes without saying that it could be mounted in the composite material of the vane 1.

With reference to FIG. 4, a method for individually and collectively reading the identification data ID1, ID2 of the vanes 1 of a fan 110 of a turbomachine 100, in particular, an aircraft turbine engine, will now be set forth.

In this example, an operator P uses a radio frequency identification reading device 4, known per se to the person skilled in the art, and places himself/herself at a distance from the turbomachine 100, in particular, upstream of the latter so as to be close to the fan 110.

Using a radio frequency identification reading device 4, the operator P radio transmits a read request REQ which is radio received by the radio antenna 30 of the identification medium 3. In particular, the read request REQ is received by the communication lobe L1 of the radio antenna 30 which is amplified due to its positioning on a fastening zone whose longitudinal fibers F are aligned along a favored fiber axis XF which is substantially aligned with the radio axis XR of said communication lobe L1.

In response to the read request REQ, the radio antenna 30 of the identification medium 3 radio transmits identification data ID1, ID2 which are read by the radio frequency identification reading apparatus 4. In particular, the identification data ID1, ID2 are transmitted by the communication lobe L1 of the radio antenna 30 which is amplified as explained previously. The read identification data ID1, ID2 are stored in a computerized manner in the radio frequency identification reading device 4.

By virtue of the invention, an operator P can conveniently, quickly and without risk of error obtain the identification data ID1, ID2 of a vane 1. Furthermore, there is no need to disassemble the upstream portion of the turbomachine 100 as in prior art.

Advantageously, amplification of the communication lobe L1 makes it possible to get rid of the electromagnetic shielding induced by the disc housings 111 and by the cone 112 and to communicate to the outside optimally.

Depending on the transmitting power of the radio frequency identification reading apparatus 4 and the distance between the radio frequency identification reading apparatus 4 and the identification medium 3, an operator can read an identification medium 3 of a vane 1 individually (low power and small distance) or collectively a plurality of identification media 3 of the vanes 1 of a fan 110 (high power and large distance). In practice, reading is made at a distance of between 50 cm and 1200 cm.

The invention claimed is:

1. A vane for a fan of an aircraft turbomachine extending along a turbomachine axis, the vane being made of a composite material and comprising:

a plurality of longitudinal conductive fibers embedded in an electrically non-conductive matrix, at least one fastening zone to which an identification medium for identifying the vane is attached, wherein the at least one fastening zone comprises a subset of the plurality of longitudinal fibers that is oriented along a favored fiber axis, the identification medium comprises at least one storage memory for storing an identification piece of data regarding the vane and at least one radio antenna comprising at least one communication lobe configured to receive a read request and transmit the identification piece of data in response to the read request, the at least one communication lobe being oriented along a radio axis, which is angularly offset from the favored fiber axis by less than 45°; and a mounting root configured to be axially mounted along the turbomachine axis, a platform comprising a radial external face, and an air deflection blade, wherein the at least one fastening zone is located at the mounting root.

2. The vane according to claim 1, wherein the mounting root comprises at least one side wall, azimuthally defined in relation to the turbomachine axis when the vane is mounted to said turbomachine, the at least one side wall comprising longitudinal fibers oriented along a favored fiber axis extending substantially orthogonally to the turbomachine axis when the vane is mounted to said turbomachine, and wherein the at least one fastening zone is located at the at least one side wall.

3. The vane according to claim 2, wherein the mounting root comprises at least one upstream wall, axially defined in relation to the turbomachine axis when the vane is mounted to said turbomachine, the at least one upstream wall comprises longitudinal fibers oriented along a favored fiber axis that extends substantially orthogonally to the turbomachine axis when the vane is mounted to said turbomachine.

4. The vane according to claim 1, wherein the identification medium is of a radio frequency identification type.

5. The vane according to claim 4, wherein the identification medium is configured to be used on a surface made of metal.

6. The vane according to claim 1, wherein the identification medium comprises an elongate shape body in which the at least one storage memory and the at least one radio antenna are mounted, the radio axis of the communication lobe extending along the length of the elongate shape body.

7. A method for reading an identification medium of at least one fan vane according to claim 1, the method comprising:

i. receiving by the at least one radio antenna a read request of the identification medium, and ii. transmitting by radio frequency at least one identification piece of data from the at least one storage memory by the at least one radio antenna of the identification medium.

8. A vane for a fan of an aircraft turbomachine extending along a turbomachine axis, the vane being made of a composite material and comprising:

a plurality of longitudinal conductive fibers embedded in an electrically non-conductive matrix, at least one fastening zone to which an identification medium for identifying the vane is attached, wherein the at least one fastening zone comprises a subset of the plurality of longitudinal fibers that is oriented along a favored fiber axis, the identification medium comprises at least one storage memory for storing an identification piece of data regarding the vane and at least one radio antenna comprising at least one communication lobe configured to receive a read request and transmit the identification piece of data in response to the read request, the at least one communication lobe being oriented along a radio axis, which is angularly offset from the favored fiber axis by less than 45°; and a mounting root configured to be axially mounted along the turbomachine axis, a platform comprising a radial external face, and an air deflection blade, wherein the at least one fastening zone is located at the platform.

9. A vane for a fan of an aircraft turbomachine extending along a turbomachine axis, the vane comprising:

a body made from a composite material having a plurality of longitudinal conductive fibers embedded in an electrically non-conductive matrix, the body comprising a mounting root, a platform, and a blade;

a fastening zone on the body to which an identification medium is attached, the identification medium containing information for identifying the vane;

wherein the fastening zone comprises a subset of the plurality of longitudinal fibers being oriented along a favored fiber axis;

wherein the identification medium comprises a storage memory for storing an identification piece of data regarding the vane and a radio antenna comprising a communication lobe configured to receive a read request and transmit the identification piece of data in response to the read request; and wherein the communication lobe is oriented along a radio axis, which is angularly offset from the favored fiber axis by less than 45°; and wherein the mounting root is configured to be axially mounted along the turbomachine axis and the fastening zone is located at the mounting root.

10. The vane according to claim 9, wherein the mounting root comprises two opposing sidewalls, azimuthally defined in relation to the turbomachine axis when the vane is mounted to said turbomachine, the two opposing sidewalls comprising longitudinal fibers oriented along a favored fiber axis extending substantially orthogonally to the turbomachine axis when the vane is mounted to said turbomachine, and wherein the fastening zone is located on one of the two opposing sidewalls.

11. The vane according to claim 10, wherein the mounting root comprises an upstream wall, axially defined in relation to the turbomachine axis when the vane is mounted to said turbomachine, the upstream wall comprises longitudinal fibers oriented along a favored fiber axis that extends substantially orthogonally to the turbomachine axis when the vane is mounted to said turbomachine.

12. The vane according to claim 9, wherein the identification medium is of a radio frequency identification type.

13. The vane according to claim 2, wherein the identification medium is configured to be used on a surface made of metal.

14. The vane according to claim 9, wherein the identification medium comprises an elongate shape body in which the storage memory and the radio antenna are mounted, the radio axis of the communication lobe extending along the length of the elongate shape body.

15. The vane according to claim 9, wherein the identification medium is secured to the fastening zone by bonding.

16. A vane for a fan of an aircraft turbomachine extending along a turbomachine axis, the vane comprising:

a body made from a composite material having a plurality of longitudinal conductive fibers embedded in an electrically non-conductive matrix, the body comprising a mounting root, a platform, and a blade;
a fastening zone on the body to which an identification medium is attached, the identification medium containing information for identifying the vane;
wherein the fastening zone comprises a subset of the plurality of longitudinal fibers being oriented along a favored fiber axis;
wherein the identification medium comprises a storage memory for storing an identification piece of data regarding the vane and a radio antenna comprising a communication lobe configured to receive a read request and transmit the identification piece of data in response to the read request; and
wherein the communication lobe is oriented along a radio axis, which is angularly offset from the favored fiber axis by less than 45°; and
wherein the fastening zone is located at the platform.

* * * * *